(No Model.)
B. G. HUDNUT.
CORN PRODUCT.
No. 491,428. Patented Feb. 7, 1893.
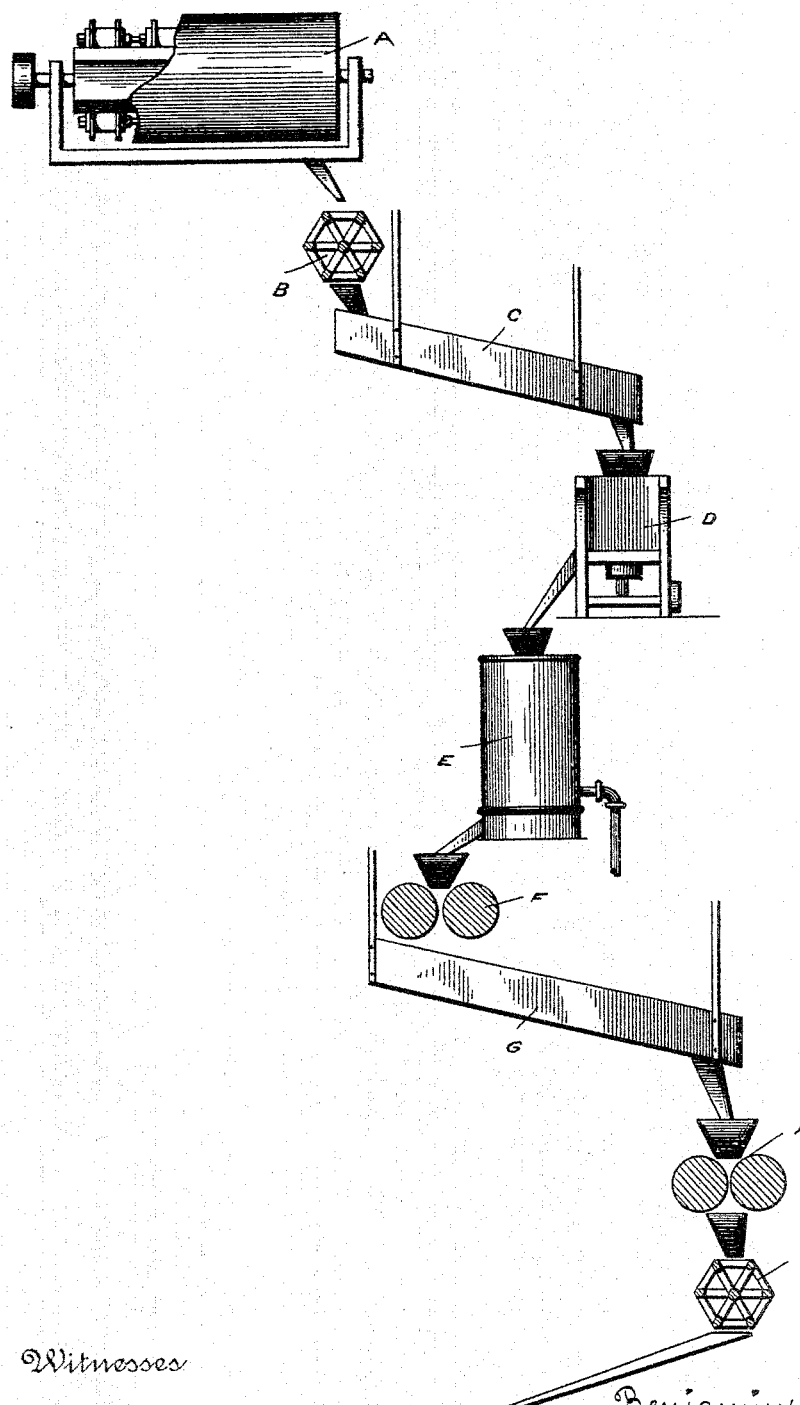
Witnesses
F. B. Nealy
E. B. Griffith
Inventor
Benjamin G. Hudnut,
By his Attorney
V. H. Lockwood.

UNITED STATES PATENT OFFICE.

BENJAMIN G. HUDNUT, OF TERRE HAUTE, INDIANA.

CORN PRODUCT.

SPECIFICATION forming part of Letters Patent No. 491,428, dated February 7, 1893.

Application filed April 20, 1892. Serial No. 429,843. (No specimens.)

*To all whom it may concern:*

Be it known that I, BENJAMIN G. HUDNUT, of Terre Haute, county of Vigo, and State of Indiana, have invented certain new and useful Improvements in Corn Products; and I do hereby declare that the following is a full, clear, and exact description thereof, reference being had to the accompanying drawing, in which like letters refer to like parts.

My invention relates to a certain new corn product and its manufacture, which I term "maizeline," and which can be used either as a food product, or for brewing purposes.

The drawing represents a diagram of the several machines used in the process of manufacturing my new corn product.

My process for making it is substantially as follows:—The raw corn is first passed through a hominy mill or degerminating machine, A, and is made into hominy. It is then passed to the reel or grader, B, to separate the hominy from the offal, thence the hominy goes to the drier, C, and thence to the cleaning and scouring machine, D, after which it is passed through any steamer or heating process commonly known. The machine, however, which I generally use is a vessel, E, preferably eighteen inches to two feet in diameter, and from three to five feet high, into the top of which the hominy, as above prepared, passes, coming out at the bottom. Steam is then injected into this vessel at the proper temperature, thus steaming the hominy to some extent, sufficiently to burst the starchy granules and swell the particles of starch. The material is then passed through the rolls, F, to be flattened or flaked. The flattened or flaked product is then passed to the drier, G, thence to the reduction rolls, H, whereby the flakes are converted into small light crystalline particles and then to the separating reels, I, where it is finally graded. It is then ready for the market, and for brewing purposes may be mixed directly with the malt.

It may be possible to make my new product in some manner different from the process described herein, but I claim this new product as my invention, however it may be made.

This new article of manufacture, "maizeline," is especially adapted for brewing purposes, and as a malt substitute is far superior to any heretofore made from corn in the quality and quantity of extract it produces, and the quickness and thoroughness of its transformation by the diastase. The starch of the corn has been converted into thoroughly soluble starch, which can be immediately and completely acted upon and converted by the diastase into saccharine matter. It is comparatively, if not altogether, free from dextrine, which is so prevalent in other malt substitutes, and which is not transformed into saccharine matter, as is desired, but into a gummy or mucilagenous substance. This latter substance is not desirable in beer, so that part of the starch of the corn which is converted in other processes into dextrine is not only lost, but proves detrimental to the beer. In maizeline no dextrine has been formed, and all the original starch is finally converted into saccharine matter, the resulting extract has more saccharine matter in it, and produces more and better beer than other corn products. This maizeline more completely and thoroughly transforms into saccharine matter than other malt substitutes, both because of its chemical nature, and because of its form. The starch of the corn having been by the process converted from its original condition into soluble starch and otherwise transformed in its nature, only one step remains to make saccharine matter of it, that is the union of diastase and the particles of starch. To assist in this union and render the transformation nearly instantaneous, the maizeline is composed of very small, fine, crystalline particles that do not pack or mass together, and are so small and light that the diastase is enabled to reach all the particles of starch immediately and transform them. Therefore it need not be put on top the malt to keep it from sinking to the bottom, but can be mixed through the malt, thereby insuring a quicker union with the diastase, and there is no reason to fear that it will sink to the bottom and "set" or "clog," as is the case with other malt substitutes from corn, for the starch will go into solution and transform before it could reach the bottom. For the reasons foregoing, the mashing need not be long, and the temperature of the mash can be kept very low, thus avoiding the formation of dextrine.

In appearance, maizeline is much like granulated sugar, consisting of small light particles, the most of which are translucent and crystalline and sparkle in the light like grains of sugar. It differs in every respect, except origin, from flour, meal, grits, flakes and other known products of corn.

What I claim as my invention and desire to secure by Letters Patent is:

1. As a new article of manufacture, a product from corn consisting of small, light, crystalline, soluble, partly converted starchy particles comparatively free from dextrine, substantially as described.

2. As a new article of manufacture, the corn product made from hominy, screened, dried and cleaned, partly converted by heat, flattened, dried, reduced and graded, substantially as described.

3. The process of treating corn, which consists in first making it into hominy; second, separating, drying and cleaning the hominy; third, partly converting the hominy by heat; fourth, flattening it; fifth, drying it; sixth, reducing the material, and, finally, grading it, substantially as shown and described.

In witness whereof I have hereunto set my hand this 16th day of April, 1892.

BENJAMIN G. HUDNUT.

Witnesses:
A. G. ADAMS,
A. G. WALKER.